Patented Aug. 14, 1945

2,381,925

UNITED STATES PATENT OFFICE 2,381,925

GLASS COMPOSITION

Alexis G. Pincus, Southbridge, Mass., assignor to American Optical Company, Southbridge, Mass., a voluntary association of Massachusetts No Drawing. Application November 24, 1941, Serial No. 420,269

15 Claims. (Cl. 106—47)

This invention pertains to a new composition of matter, namely a glass, and more particularly to a glass which is highly resistant to attack by hydrofluoric acid, anhydrous hydrogen fluoride, and fluorides in general. While many attempts have been made in the past to develop a glass highly resistant to hydrofluoric acid, to date there has been no glass commercially successful which resists the attack to a practical degree. The present invention embraces a glass which does have high resistivity to the action of hydrofluoric acid, which resistivity is comparable to that of silicate glasses when exposed to hydrochloric acid attack in a similar test under similar conditions.

It is therefore an object of the present invention to provide a glass composition which will resist the attack of hydrofluoric acid to a degree substantially comparable to the attack of hydrochloric acid on ordinary laboratory glassware, that is to a degree making feasible storage of hydrofluoric acid in containers made from said glass.

A further object of the invention is to provide a glass which is highly resistant to the attack of hydrofluoric acid, which hydrofluoric acid resistant glass will have substantially the same melting and working characteristics as ordinary glass so that it can be manufactured by existing equipment and techniques.

A further object of the invention is to provide a hydrofluoric acid resistant glass consisting essentially of phosphorous pentoxide ($P_2O_5$), alumina ($Al_2O_3$), and zinc oxide (ZnO).

A further object of the invention is to provide a glass which is highly resistant to attack by hydrofluoric acid, which glass consists essentially of phosphorous pentoxide, alumina and either zinc oxide, beryllium oxide, or lead oxide, or a combination of any of said metallic oxides.

A further object is to provide a glass composition which is highly resistant to attack by hydrofluoric acid, said glass composition being made from a batch consisting essentially of aluminum metaphosphate and zinc oxide or zinc phosphate.

A further object of the invention is to provide a glass substantially free from attack by hydrofluoric acid, which glass consists essentially of phosphorous pentoxide, alumina, and zinc oxide with addition of approximately one-tenth of one percent or less of an alkali.

The use of aluminum metaphosphate for making glass has been described in my co-pending application, Serial No. 410,879 and it is recognized that $Al_2O_3$ and $P_2O_5$, as independent ingredients have been heretofore known in the prior art for use in making glass. The present application is primarily a phosphate glass which may be manufactured by use of aluminum metaphosphate as set forth in substance in my said co-pending application but with additional ingredients added to provide a glass which is substantially free from attack by hydrofluoric acid and to improve the melting and working characteristics.

In selecting the ingredients to be included, the following considerations apply.

The alkaline earth family is entirely avoided in manufacturing glass as set forth in the present application. It is to be understood that the alkaline earth family generally includes barium, strontium, calcium, and magnesium. The reason for avoiding the use of the alkaline earth family materials is that they form insoluble fluorides. When an alkaline earth containing glass is exposed to attack by hydrofluoric acid, a white film forms on the surface of the glass due to the precipitation of the alkaline earth fluoride. The glasses of the present invention, on the other hand, remain transparent, smooth, and seemingly unattacked even under extreme conditions.

It is definitely an objective of the present application to eliminate as far as practicable any trace of silicon dioxide ($SiO_2$) or boric oxide ($B_2O_3$). More specifically, it is desirable to eliminate any silicon compounds or boron compounds, because they lead to decomposition of the glass by their strong tendency to evolve as gaseous silicon tetrafluoride or baron trifluoride, leading to decomposition of glass containing them upon exposure to HF or fluorides. The same is true of arsenic and antimony. It is also desirable that the trace of silica dissolved by attack upon the refractory should be kept to a minimum by controlling melting conditions in suitable containers for the batch.

Zirconia is very insoluble in these phosphate glasses, and tin and thoria can be dissolved in only limited quantities. Small amounts of titania dissolve and aid acid resistance but favor easy devitrification and cause a violet coloration.

Of the remaining common glass-making materials, additions of beryllia, zinc oxide, or lead oxide, all decrease the amount of attack by hydrofluoric acid and improve the working properties and devitrification resistance. Alkali additions improve working properties and devitrification resistance, but lead to rapid increase in solubility.

Of the substances available for blending with alumnium metaphosphate zinc oxide seems preferable on the basis of cost, and the effects which its use confers.

In general, coloring agents are not included in the batch as it is ordinarily desirable to keep the transparency of the glass at a maximum. It is pointed out that coloring agents may be used under certain conditions for obtaining a desired tint in the glass without any appreciable reducing of the resistivity to attack by hydrofluoric acid.

A formula for obtaining this glass is as follows:

*Example I*

| Ingredient | Range, parts by weight | Specific example, percentage by weight |
| --- | --- | --- |
| $P_2O_5$ | 60 to 85 | 72 |
| $Al_2O_3$ | 10 to 20 | 18 |
| ZnO | 1 to 30 | 10 |
| | | 100 |

A glass corresponding to this example may be prepared by weighing 90 parts of aluminum metaphosphate and 10 parts of zinc oxide, mixing thoroughly, and then dumping into a high grade aluminum silicate refractory container in a furnace at 2450–2600° F. Melting takes place smoothly and quickly, but it is good practice to hold the melt at this top temperature for several hours depending upon the size of the batch in order to ensure thorough homogenization. The temperature of the melt is then dropped to about 2100°, and held there until the temperature equalizes through the mass. The glass is now at a suitable viscosity for working by any of the common methods; such as casting, rolling, drawing, blowing, etc.

The resultant glass is of a very high quality in spite of the simplicity of the batch and the absence of arsenic, sulphate, or any of the ordinary refining agents.

Traces of iron, present as impurity, may color the glass a light green as it does in ordinary silicate glass. But inclusion of a fractional part of a suitable reducing agent, such as an ammonium salt, eliminates this green tint and the product is a sparkling, water-white glass, gemlike in clarity.

It is to be understood that a glass of the analysis set forth may be synthesized from any suitable sources of $P_2O_5$, $Al_2O_3$, and ZnO. For example, the zinc may be derived from zinc carbonate, orthophosphate, or metaphosphate. $P_2O_5$ may be derived from phosphoric anhydride, acids, ammonium phosphates, or the metal phosphate salts. $Al_2O_3$ may be derived from ignited alumina, alumina hydrate, zinc aluminate, or aluminium orthophosphate, as well as from aluminium metaphosphate.

When making a batch of glass using aluminum metaphosphate from which the combined $P_2O_5$ and $Al_2O_3$ is obtained, it has been found advantageous to also include an additional amount of $P_2O_5$ from some suitable source. The amount of the additional $P_2O_5$ is determined by the size of the batch, and in most instances will not exceed from one to ten parts by weight of the resultant batch. While such excess leads to a certain amount of fuming in the early stages of melting, the $P_2O_5$ seems to set up a protection against corrosion of the refractory, and thus minimizes the amount of $SiO_2$ dissolved into the melt from the refractory.

In a test to show the resistivity to attack of hydrofluoric acid on a piece of hydrofluoric resistant glass made according to the specific example above, a piece of said glass was immersed in a bath of hydrofluoric acid for 500 hours. At the end of that time the glass was substantially transparent and showed no obvious attack to the naked eye. However, when weighed, it was found that there was an extremely slight loss of weight which would be of a comparable order of magnitude to the loss in weight of comemrcial laboratory ware when exposed to hydrochloric acid attack in a similar test. A piece of soda-lime-silica glass immersed in the hydrofluoric acid bath at the same time was converted to a chalky mass within a few days.

It would be ordinarily supposed that when the batch such as set forth in Example I was melted in a silica containing refractory that there would be some deleterious attack upon the refractory by the melt. It would therefore seem that a special refractory material such as alumina, zirconia or platinum might be required. However, from actual tests it was found that the attack on the silica containing refractory was so slight that the resulting glass was equally as resistant as one melted in a crucible of sintered alumina or of platinum. The melting and working properties of the present hydrofluoric resistant glass is about the same as the melting and working properties of the soda-lime-silica glasses of commerce. This means that it can be manufactured in a regular glass factory with all the equipment and conditions the same. No new equipment, machinery or technique are required to produce glass embraced by the present application.

While the glass composition set forth in Example I is very satisfactory for general use, in some isolated cases, such as when working the glass wherein it has to be held for a long time in the critical range where the tendency to crystallization may be strongest, it may be desirable to make a glass with a wider range of working temperatures. This is possible by including beryllium oxide, or lead oxide in addition to the zinc oxide. A very small amount of alkali, such as lithium oxide in the amount of approximately one-tenth of one percent or less may be added with the BeO or PbO, or added to the batches as set forth in Examples I, and in the following Examples II, or III. It is also possible to add the lithia in the form of lithium fluoride.

While the use of zinc has been specifically set forth in combination with phosphorous pentoxide and alumina, lead oxide and beryllium oxide may be utilized as a substitute for the zinc oxide.

A fundamental formula for obtaining a hydrofluoric acid resistant glass by using beryllium oxide in lieu of the zinc oxide is set forth as follows:

*Example II*

| Ingredient | Range, parts by weight | Specific example, percentage by weight |
| --- | --- | --- |
| $P_2O_5$ | 70 to 85 | 76 |
| $Al_2O_3$ | 10 to 20 | 19 |
| BeO | 1 to 10 | 5 |
| | | 100 |

A fundamental formula for obtaining a hydrofluoric acid resistant glass by using lead oxide in lieu of the zinc oxide is set forth as follows:

*Example III*

| Ingredient | Range, parts by weight | Specific example, percentage by weight |
|---|---|---|
| $P_2O_5$ | 60 to 85 | 76 |
| $Al_2O_3$ | 10 to 20 | 19 |
| PbO | 0.5 to 20 | 5 |
| | | 100 |

Specific formulas have been set forth in the Examples I, II, and III using zinc oxide, beryllium oxide, and lead oxide respectively in said examples. It has been found from actual tests that $P_2O_5$ and $Al_2O_3$ may be blended with a combination of zinc oxide, beryllium oxide, or lead oxide, or any combination of said last three oxides with the maximum percentage of the combined bivalent metal oxides varying in range from 1 to 30 percent by weight.

An example of a good hydrofluoric acid resistant glass has been made by combining 72 parts by weight of $P_2O_5$, 18 parts by weight of $Al_2O_3$, and about 12 parts by weight of CnO and PbO and also by a combination of ZnO, BeO, and PbO. The use of the two or more components from the ZnO, BeO, and PbO group has been found beneficial for improving the workability of the glass and decreasing any tendency toward devitrification.

The $P_2O_5$ and $Al_2O_3$ may have the range in parts by weight as set forth in Example I when combined with any of the group consisting of ZnO, BeO, and PbO.

While percentage by weight has been used in certain of the examples, it is to be understood that this also means parts by weight for the specific examples referred to which have been specifically set forth as percentage by weight.

The glass resulting from the composition set forth herein can be ground and polished, tempered, and subjected to the usual processes of glass technology without requiring any special technique or equipment.

While hydrofluoric acid has been specifically mentioned herein, it is to be understood that it is the fluoride ion of the acid which attacks ordinary glass and consequently the glass of the present invention is resistant to fluoride ion regardless of the source of its derivation.

Having described my invention, I claim:

1. A glass composition whose chemical analysis may be expressed as follows:

| Ingredient | Parts by weight |
|---|---|
| $P_2O_5$ | 60 to 85 |
| $Al_2O_3$ | 10 to 20 |
| ZnO | 1 to 30 |

2. A glass composition whose chemical analysis may be expressed as follows:

| Ingredient | Percentage by weight |
|---|---|
| $P_2O_5$ | 72 |
| $Al_2O_3$ | 18 |
| ZnO | 10 |

3. A glass composition whose chemical analysis may be expressed as follows:

| Ingredient | Parts by weight |
|---|---|
| $P_2O_5$ | 70 to 85 |
| $Al_2O_3$ | 10 to 20 |
| BeO | 1 to 10 |

4. A glass composition whose chemical analysis may be expressed as follows:

| Ingredient | Percentage by weight |
|---|---|
| $P_2O_5$ | 76 |
| $Al_2O_3$ | 19 |
| BeO | 5 |

5. A glass composition whose chemical analysis may be expressed as follows:

| Ingredient | Parts by weight |
|---|---|
| $P_2O_5$ | 60 to 85 |
| $Al_2O_3$ | 10 to 20 |
| PbO | 0.5 to 20 |

6. A glass composition whose chemical analysis may be expressed as follows:

| Ingredient | Percentage by weight |
|---|---|
| $P_2O_5$ | 76 |
| $Al_2O_3$ | 19 |
| PbO | 5 |

7. A glass composition which is highly resistant to attack by fluoride ion or hydrofluoric acid, said glass composition consisting of about two-thirds parts by weight of phosphorus pentoxide and about one-third parts by weight of aluminum oxide and zinc oxide.

8. A glass composition which is highly resistant to attack by hydrofluoric acid, said glass composition consisting of about seventy parts by weight of phosphorus pentoxide, eighteen parts by weight of aluminum oxide, and twelve parts by weight consisting of one or more of the following components selected from the group of zinc oxide, beryllium oxide, and lead oxide.

9. The process of making a glass composition which is highly resistant to attack by hydrofluoric acid or fluoride ion comprising the steps of mixing suitable sources of phosphorus pentoxide, aluminum oxide, and any one of the group of zinc oxide, beryllium oxide, and lead oxide, the phosphorus pentoxide being approximately two-thirds parts by weight and the aluminum oxide and any one or more of said group of zinc oxide, beryllium oxide, and lead oxide being approximately one-third parts by weight, a further step of heating the batch to fusion, and a further step of permitting the glass to cool slowly.

10. A glass composition whose chemical analysis may be expressed substantially as follows:

| Ingredient | Parts by weight |
|---|---|
| $P_2O_5$ | 60 to 85 |
| $Al_2O_3$ | 10 to 20 | and an ingredient selected from the metal oxide group consisting of ZnO, BeO, and PbO in the amount of 0.5 to 30 parts by weight.

11. A glass composition whose chemical analysis may be expressed substantially as follows:

| Ingredient | Parts by weight |
|---|---|
| $P_2O_5$ | 60 to 85 |
| $Al_2O_3$ | 10 to 20 | and an ingredient selected from the metal oxide group consisting of ZnO, BeO, and PbO in the amount of 0.5 to 30 parts by weight and containing an alkali oxide in a very small amount of approximately one-tenth part or less.

12. A glass composition which is highly resistant to attack by fluoride ion or hydrofluoric acid, said glass composition consisting of about two-thirds parts by weight of phosphorus pentoxide and about one-third parts by weight of aluminum oxide and zinc oxide and further containing a small amount of an alkaline fluoride as a conditioner.

13. A glass composition which is highly resistant to attack by fluoride ion or hydrofluoric acid, said glass composition consisting of about two-thirds parts by weight of phosphorus pentoxide and about one-third parts by weight of aluminum oxide and zinc oxide and containing an alkali oxide in a very small amount of approximately one-tenth part or less by weight.

14. The process of making a glass composition which is highly resistant to attack by hydrofluoric acid or fluoride ion comprising the steps of mixing approximately 90 parts by weight of aluminum metaphosphate and approximately 10 parts by weight of an oxide or oxides selected from a group comprising zinc, beryllium and lead, a further step of heating the batch to fusion and a further step of permitting the glass to cool slowly.

15. The process of making a glass composition which is highly resistant to attack by hydrofluoric acid or fluoride ion comprising the steps of mixing approximately 90 parts by weight of aluminum metaphosphate and approximately 10 parts by weight of an oxide or oxides of the group comprising zinc, beryllium and lead, a further step of heating said batch to a temperature of between 2450° to 2600° F. for a time interval sufficient to melt said batch to a homogeneous structure and thereafter reducing the temperature to permit the glass to cool slowly.

ALEXIS G. PINCUS.